(12) United States Patent
Melville

(10) Patent No.: US 11,899,197 B2
(45) Date of Patent: Feb. 13, 2024

(54) RASTER SCANNED PROJECTOR WITH MICROELECTROMECHANICAL SYSTEM SCANNER

(71) Applicant: Magic Leap, Inc., Plantation, FL (US)

(72) Inventor: Charles David Melville, Camano Island, WA (US)

(73) Assignee: Magic Leap, Inc., Plantation, FL (US)

( * ) Notice: Subject to any disclaimer, the term of this patent is extended or adjusted under 35 U.S.C. 154(b) by 414 days.

(21) Appl. No.: 17/132,655

(22) Filed: Dec. 23, 2020

(65) Prior Publication Data

US 2021/0223537 A1    Jul. 22, 2021

Related U.S. Application Data

(63) Continuation of application No. PCT/US2019/039084, filed on Jun. 25, 2019.
(Continued)

(51) Int. Cl.
*G02B 26/08*  (2006.01)
*G02B 26/10*  (2006.01)
*H04N 9/31*   (2006.01)

(52) U.S. Cl.
CPC ....... *G02B 26/0833* (2013.01); *G02B 26/101* (2013.01); *G02B 26/103* (2013.01); *H04N 9/3129* (2013.01)

(58) Field of Classification Search
CPC  G02B 26/0833; G02B 26/101; G02B 26/103; H04N 9/3129
See application file for complete search history.

(56) References Cited

U.S. PATENT DOCUMENTS 3,544,201 A   12/1970   Fowler et al.
6,845,190 B1   1/2005   Smithwick et al.
(Continued)

FOREIGN PATENT DOCUMENTS

EP   1655629 A2   5/2006
EP   3062138 A1   8/2016
(Continued)

OTHER PUBLICATIONS

PCT/US2019/039084, "International Preliminary Report on Patentability", dated Jan. 7, 2021, 14 pages.
(Continued)

*Primary Examiner* — Euncha P Cherry
(74) *Attorney, Agent, or Firm* — KILPATRICK TOWNSEND & STOCKTON LLP

(57) ABSTRACT

An optical scanner is described and includes an optical beam assembly and a transducer. The optical beam assembly includes a pivoting portion having a cantilevered beam; a stationary portion; a first torsional flexure coupling a first side of the pivoting portion to the stationary portion; and a second torsional flexure coupling a second side of the pivoting portion to the stationary portion. The transducer includes a first magnetic element disposed on the pivoting portion and a second magnetic element disposed on the stationary portion. The first and second magnetic elements are configured to generate magnetic fields that interact to rotate the pivoting portion relative to the stationary portion about an axis defined by the first and second torsional flexures.

20 Claims, 13 Drawing Sheets

Related U.S. Application Data

(60) Provisional application No. 62/690,279, filed on Jun. 26, 2018.

(56) References Cited

U.S. PATENT DOCUMENTS

| | | |
|---|---|---|
| 7,583,872 B2 | 9/2009 | Seibel et al. |
| 7,738,762 B2 | 6/2010 | Melville et al. |
| 9,874,739 B2 | 1/2018 | Tsuruta et al. |
| 2001/0055462 A1 | 12/2001 | Seibel |
| 2004/0122328 A1 | 6/2004 | Wang et al. |
| 2007/0019906 A1 | 1/2007 | Melville |
| 2009/0028407 A1 | 1/2009 | Seibel et al. |
| 2009/0235396 A1 | 9/2009 | Wang et al. |
| 2009/0289747 A1 | 11/2009 | Duraffourg et al. |
| 2012/0080612 A1 | 4/2012 | Grego et al. |
| 2013/0208330 A1* | 8/2013 | Naono ............ G02B 26/10 359/200.1 |
| 2013/0324858 A1 | 12/2013 | Xu et al. |
| 2015/0164311 A1 | 6/2015 | Yu et al. |
| 2015/0268415 A1 | 9/2015 | Schowengerdt et al. |
| 2017/0010462 A1 | 1/2017 | Yokota et al. |
| 2018/0107007 A1 | 4/2018 | Wyrwas et al. |
| 2018/0275396 A1 | 9/2018 | Schowengerdt et al. |
| 2019/0155019 A1 | 5/2019 | Melville |

FOREIGN PATENT DOCUMENTS

| | | |
|---|---|---|
| WO | 2020006008 A1 | 1/2020 |
| WO | 2020006011 A1 | 1/2020 |

OTHER PUBLICATIONS

PCT/US2019/039084, "International Search Report and Written Opinion", dated Nov. 19, 2019, 11 pages.

PCT/US2019/039084, "Invitation to Pay Additional Fees and, Where Applicable, Protest Fee", dated Sep. 18, 2019, 2 pages.

PCT/US2019/039088, "International Preliminary Report on Patentability", dated Jan. 7, 2021, 8 pages.

PCT/US2019/039088, "International Search Report and Written Opinion", dated Sep. 24, 2019, 10 pages.

U.S. Appl. No. 17/133,417, "Non-Final Office Action", dated Nov. 14, 2023, 9 pages.

* cited by examiner

RASTER SCANNED PROJECTOR WITH MICROELECTROMECHANICAL SYSTEM SCANNER

CROSS-REFERENCES TO RELATED APPLICATIONS

This application is a continuation of International Patent Application No. PCT/US2019/039084, filed Jun. 25, 2019, entitled "RASTER SCANNED PROJECTOR WITH MICROELECTROMECHANICAL SYSTEM SCANNER," which claims the benefit of priority to U.S. Provisional Patent Application No. 62/690,279, filed Jun. 26, 2018, entitled "RASTER SCANNED PROJECTOR WITH MICROELECTROMECHANICAL SYSTEM SCANNER," the entire disclosures of which are hereby incorporated by reference, for all purposes, as if fully set forth herein.

BACKGROUND OF THE INVENTION

Modern computing and display technologies have facilitated the development of systems for virtual or augmented reality experiences, where digitally reproduced images or portions thereof are presented to a viewer in a manner wherein they seem to be, or may be perceived as real. A virtual reality, or "VR," scenario typically involves presentation of digital or virtual image information without transparency to other actual real-world visual input; an augmented reality, or "AR" scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

This disclosure describes various embodiments that relate to optical scanners having transducers for manipulating fiber or cantilevered beam scanners. In particular, different types of transducers or scanning actuators are described.

An optical scanner is disclosed and includes a cantilevered beam assembly that includes: a stationary portion; a pivoting portion having a cantilevered beam dimensioned to resonate in a bend mode in a plane at a first frequency; at least one torsional flexure coupling the pivoting portion to the stationary portion, the at least one torsional flexure being configured to allow the plane within which the cantilevered beam is positioned to rotate about an axis defined by the at least one torsional flexure at a second frequency; and a transducer for maneuvering the cantilevered beam in a scan pattern.

An optical scanner, is disclosed and includes a cantilevered beam assembly, that includes a pivoting portion comprising a cantilevered beam; a stationary portion; a first torsional flexure coupling a first side of the pivoting portion to the stationary portion; and a second torsional flexure coupling a second side of the pivoting portion to the stationary portion; and a transducer comprising a first magnetic element disposed on the pivoting portion and a second magnetic element disposed on the stationary portion, the first and second magnetic elements being configured to generate magnetic fields that interact to rotate the pivoting portion relative to the stationary portion about an axis defined by the first and second torsional flexures.

Another optical scanner is disclosed and includes the following: a cantilevered beam assembly, comprising: a stationary portion; a pivoting portion comprising a cantilevered beam dimensioned to resonate in a bend mode in a plane at a first frequency; at least one torsional flexure coupling the pivoting portion to the stationary portion, the at least one torsional flexure being configured to allow the cantilevered beam to rotate about an axis defined by the at least one torsional flexure; a transducer for maneuvering the cantilevered beam in a scan pattern. The optical scanner can also include a first optical fiber and a first waveguide configured to deliver light from the first optical fiber to a distal end of the cantilevered beam, and a second optical fiber and a second waveguide configured to deliver light from the second optical fiber to the distal end of the cantilevered beam.

The aforementioned optical scanner configurations have many advantages. In particular, the optical scanner can be miniaturized by forming the stationary and pivoting portions of the cantilevered beam assemblies from a layer of monocrystalline silicon. In this way, an overall thickness of a majority of the optical scanner can be about 100 microns thick. Furthermore, waveguides can be formed along an upper surface of the stationary and pivoting portions of the cantilevered beam assembly, thereby removing the need for additional assembly steps involved with a separate waveguide structure. Some configurations of the optical scanner do not require power to be routed to the pivoting portion of the cantilevered beam assembly. For example, when the transducer is a purely magnetic transducer and the portion of the magnetic transducer positioned on the pivoting portion is a permanent magnet, no power need be routed to the pivoting portion of the cantilevered beam assembly.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION OF SPECIFIC EMBODIMENTS

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Image generating components can take many forms. When designing image generating components for use with wearable devices, designs having a small form factors can be beneficial as the small form factor can allow for a reduction in size and/or weight of the wearable device. Energy efficiency can also be important to the design as the energy efficiency allows for the wearable device to be used for longer periods of time without the need for bulky energy sources.

One way of achieving a small form factor and energy efficient optical scanner is with a MEMS (Micro-Electro-Mechanical Systems) design. The optical scanner can be formed from a silicon substrate and include a protruding cantilevered beam. The protruding cantilevered beam can be part of a pivoting portion of a cantilevered beam assembly. The cantilevered beam assembly can be a transducer assembly that includes an electromagnet that cooperates with a permanent magnet to induce a pivoting motion in the pivoting portion of the cantilevered beam assembly. In some embodiments, the interaction between the electromagnet and permanent magnet can be limited to vertical motion about an axis defined by flexures that join the pivoting portion of the cantilevered beam assembly to a stationary portion of the cantilevered beam assembly. In some embodiments, the electromagnets and permanent magnets can be offset so that both vertical and horizontal oscillation is generated by the interaction of the magnetic fields. When the motion induced by the magnetic field interaction is limited to vertical motion, the pivoting portion of the cantilevered beam assembly can include piezoelectric actuators that are configured to induce horizontal motion in the cantilevered beam of the pivoting portion of the cantilevered beam assembly so that the cantilevered beam is able to move both vertically and horizontally to achieve a desired scan pattern.

These and other embodiments are discussed below with reference to FIGS. 1-8; however, those skilled in the art will readily appreciate that the detailed description given herein with respect to these figures is for explanatory purposes only and should not be construed as limiting.

Figure 1:
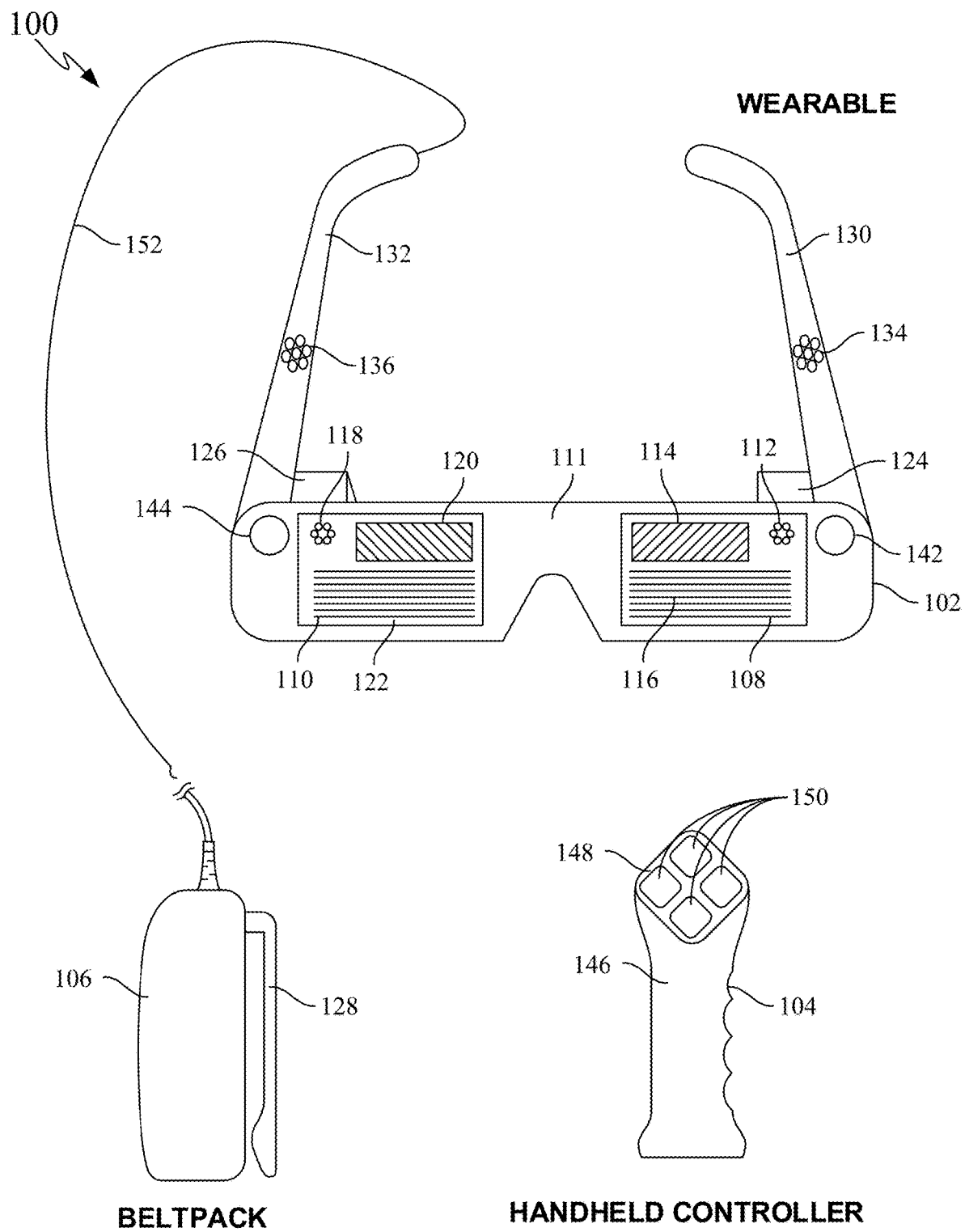
FIG. 1 shows an exemplary augmented reality system 100 according to an embodiment of the present invention.

FIG. 1 shows an exemplary augmented reality system 100 according to an embodiment of the present invention. As shown in FIG. 1, the system 100 includes augmented reality headgear 102, a handheld controller 104, and an auxiliary unit 106. The augmented reality headgear 102 includes a left (user's left) transparent waveguide set eyepiece (herein below "left eyepiece") 108 and a right transparent waveguide set eyepiece (herein below "right eyepiece") 110. Each eyepiece 108, 110 includes surface diffractive optical elements for controlling the flow of imagewise modulated light. Eyepieces 108 and 110 are held in position by optical frame 111. The left eyepiece 108 includes a left incoupling grating 112, a left orthogonal pupil expansion (OPE) grating 114 and a left exit (output) pupil expansion (EPE) grating 116. Similarly, the right eyepiece 110 includes a right input coupling grating 118, a right OPE grating 120 and a right EPE grating 122. Imagewise modulated light is transferred via the input coupling gratings 112, 118, OPEs 114, 120 and EPE 116, 122 to a user's eye. Alternatively, in lieu of the input coupling grating 112, 118, OPE grating 114, 120 and EPE grating 116, 122, the eyepieces 108, 110 include refractive and reflective features for controlling the coupling of imagewise modulated light to the user's eyes.

A left source of imagewise modulated light 124 is optically coupled into the left eyepiece 108 through the left incoupling grating set 112, and a right source of imagewise modulated light 126 is optically coupled into the right eyepiece 110 through the right incoupling grating set 118. The input coupling grating sets 112, 118 deflect light from sources of imagewise modulated light 124, 126 to angles above the critical angle for Total Internal Reflection (TIR) for the eyepieces 108, 110. The OPE grating sets 114, 120 incrementally deflect light propagating by TIR down toward the EPE grating sets 116, 122. The EPE grating sets 116, 122 incrementally couple light out toward the user's face including the user's eyes' pupils. Each eyepiece 108, 110 can include multiple waveguide planes used to handle different color components and/or provided with EPE grating sets 116, 122 having different grating line curvatures in order to impart different wavefront curvatures (corresponding to different virtual image distances) to imagewise modulated light.

The auxiliary unit 106, also labeled beltpack, can include a battery to provide energy to operate the system 100, and can include a processor for executing programs to operate the system 100. As shown, the auxiliary unit 106 includes a clip 128 that is useful for attaching the auxiliary unit 106 to a user's belt. Alternatively, the auxiliary unit 106 can have a different form factor.

The augmented reality headgear 102 also includes a left temple arm 130 and a right temple arm 132. The left temple arm 130 includes a left temple speaker port 134 and the right temple arm 132 includes a right temple speaker port 136.

The handheld controller 104 includes a grip portion 146 and a top 148 that includes a plurality of buttons 150. The auxiliary unit 106 is coupled to the headgear 102 through a cable 152, which can, for example, include electrical wires and fiber optics. Wireless connections between the auxiliary unit 106 and the headgear 102 can also be used. World cameras 142 and 144 are shown oriented outwardly to cooperatively cover a front facing portion of a user's field of view. In this way, augmented reality headgear 102 is able to incorporate digital content with real-world items surrounding the user. In some embodiments, world cameras 142 and 144 can include or cooperatively operate in conjunction with depth detection sensors to fully characterize a user's surroundings.

Figure 2:
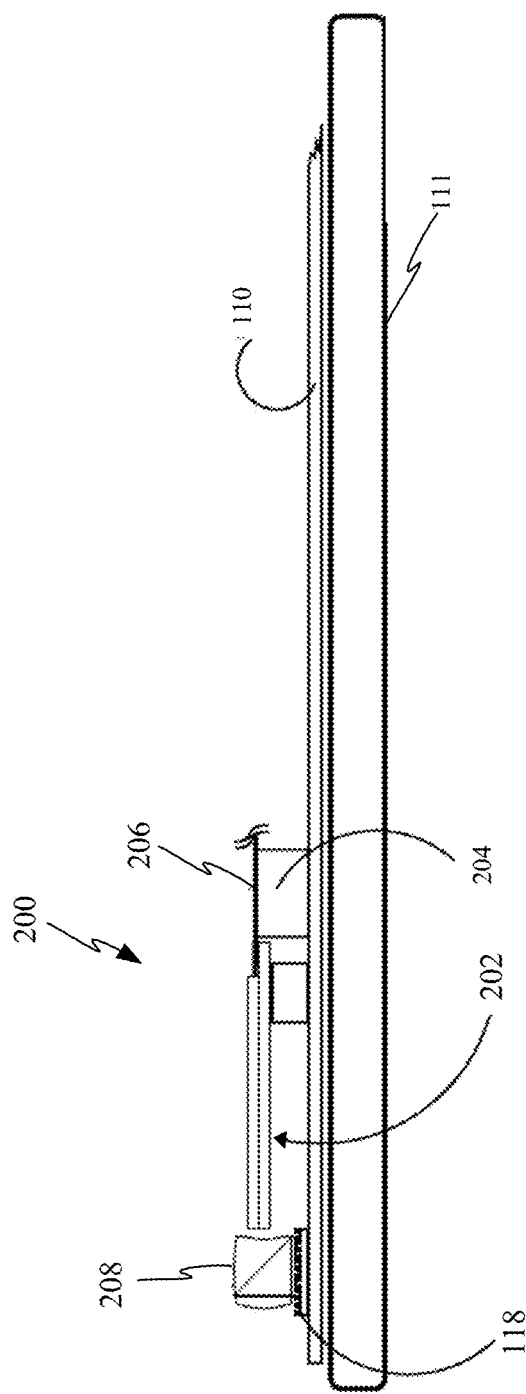
FIG. 2 shows a top view revealing an exemplary configuration that includes an optical assembly according to an embodiment of the present invention.

FIG. 2 shows a top view revealing an exemplary configuration that includes an optical assembly 200 according to an embodiment of the present invention. Optical assembly 200 includes optical scanner 202 affixed to a rear-facing surface of eyepiece 110. By orientating optical scanner 202 in this manner, an overall thickness of an optical stack can be reduced. Optical scanner 202 is depicted being affixed to eyepiece 110 by mechanical support structure 204. In some embodiments, mechanical support structure 204 can instead be affixed to optical frame 111 to avoid adverse interaction between mechanical support structure 204 and eyepiece 110. In some embodiments, an optically reflective material can be affixed between mechanical support structure 204 and eyepiece 110 in order to reduce the occurrence of light being prematurely decoupled from eyepiece 110. Light can be delivered to optical scanner 202 by optical fiber 206. Light delivered by optical fiber 206 is then distributed in a predefined scan pattern by optical scanner 202. The predefined pattern is then received and transmitted to input coupling grating 118 by collimating and coupling optic 208. It should be appreciated that the light can be spread by a cantilevered structure having one or more waveguides that receive the light from optical fiber 206. For example, a silicon beam including one or more optical waveguides can also be used in lieu of optical fiber 206.

Figure 3:
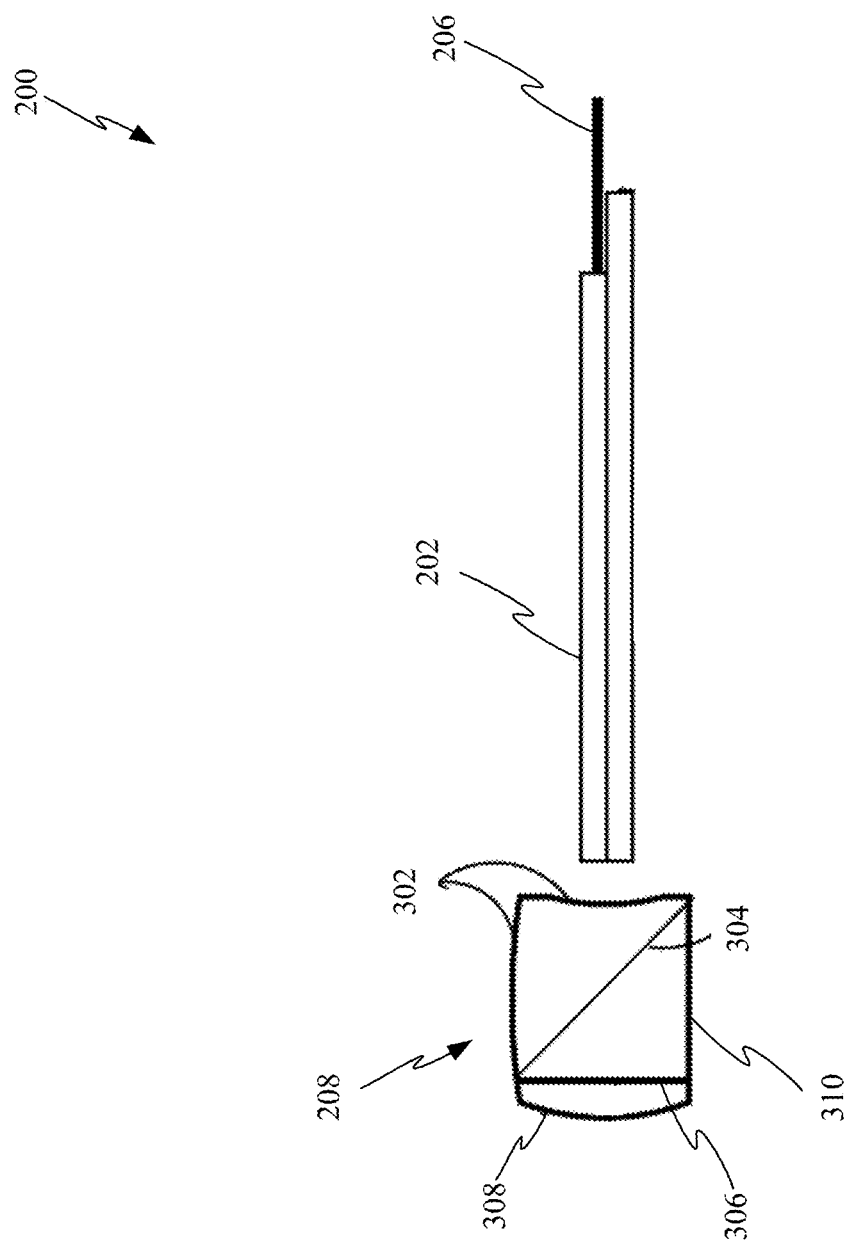
FIG. 3 shows a close up view of the optical assembly depicted in FIG. 2 according to an embodiment of the present invention.

FIG. 3 shows a close up view of optical assembly 200 according to an embodiment of the present invention. In particular, details of collimating and coupling optic 208 are shown and described herein below. Light emitted from optical scanner 202 enters collimating and coupling optic 208 through one of curved refractive surfaces 302. In some embodiments, light generated by optical scanner can be polarized so that substantially all of it passes through polarizing beam splitter 304. The light then passes through quarter wave plate 306 at which point it is converted from linearly polarized light to circular polarized light and then reflects off curved mirror 308. Circular polarized light reflecting off curved mirror 308 results in a reversal of the circular polarization handedness of light. Upon passing through the quarter wave plate 306 a second time, the circular polarized light is then reconverted to linearly polarized light but with a polarization direction perpendicular to the initial linear polarization. The net effect is that the polarization of the light is reversed so that now instead of passing through beam splitter 304 it reflects off of beam splitter 304 to exit collimating and coupling optic 208 through outcoupling surface 310 to enter input coupling grating 118. The outcoupling surface 310 may also have some optical power. Additional description related to optical assembly 200 is provided in U.S. patent application Ser. No. 15/927,765, titled "Method and System for Fiber Scanning Projector," filed on Mar. 21, 2018, the disclosure of which is hereby incorporated by reference in its entirety for all purposes.

Figure 4A:
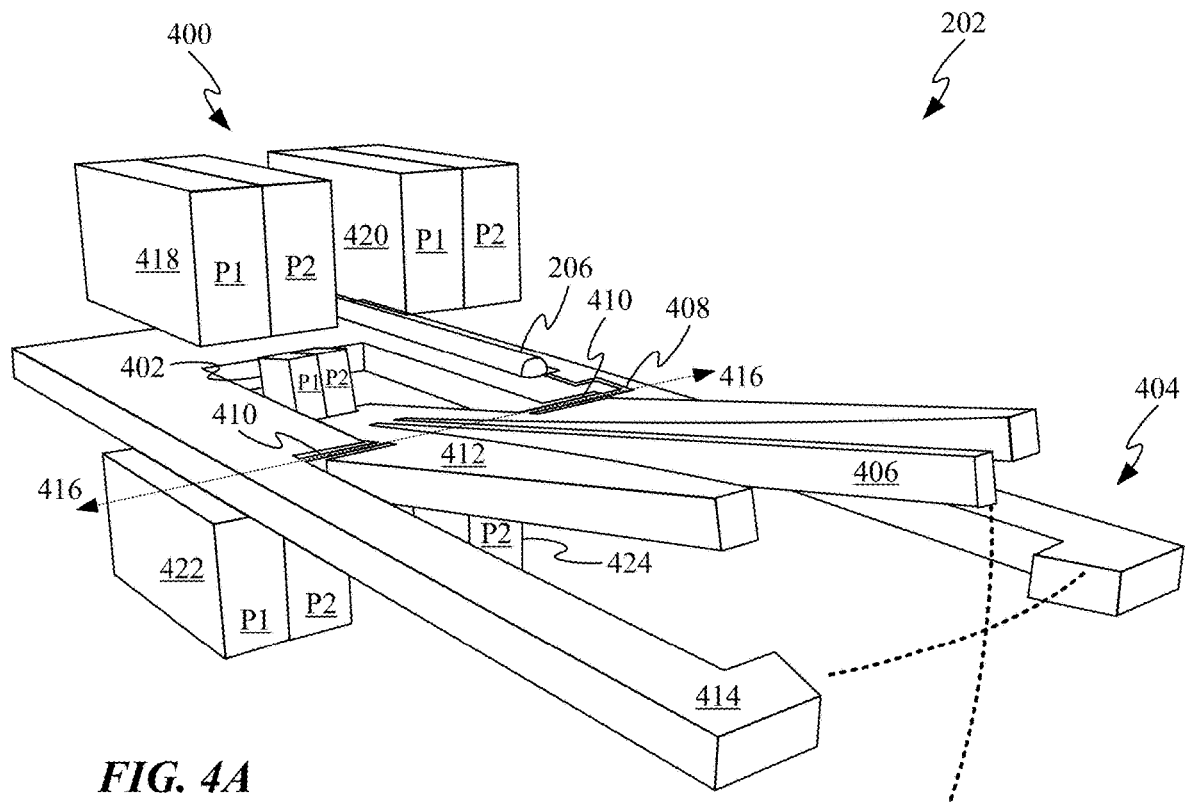
FIGS. 4A-4C show various views of an optical scanner having a cantilevered beam capable of generating a raster scan according to an embodiment of the present invention.

FIG. 4A shows a perspective view of optical scanner 202, which includes optical fiber 206 and a magnetic transducer assembly 400 according to an embodiment of the present invention. Magnetic transducer assembly 400 includes a permanent magnet 402 that is coupled to a cantilevered beam assembly 404. Cantilevered beam assembly 404 is formed from a monocrystalline silicon substrate that has undergone one or more manufacturing processes to form a cantilevered beam 406, a waveguide 408 and flexures 410. A thickness of the monocrystalline silicon substrate can be about 100 microns. Flexures 410 couple a pivoting portion 412 of cantilevered beam assembly 404 that includes cantilevered beam 406 to a stationary portion 414 of cantilevered beam assembly 404. Flexures 410 allow pivoting portion 412 to rotate relative to stationary portion 414 about axis of rotation 416. In some cases, flexures 410 are torsional flexures. Waveguide 408 is configured to deliver light supplied by optical fiber 202 to a distal end of cantilevered beam 406.

FIG. 4A shows how magnetic transducer assembly 400 also includes electromagnets 418, 420, 422 and 424 disposed above and below permanent magnet 402. A polarity of permanent magnet 402 and electromagnets 418-420 is indicated by the P1 and P2 designations. It should be appreciated that in some embodiments it may be desirable to reverse the polarity of electromagnets 418-424 by reversing the flow of electricity through electromagnets 418-424 so that instead of only generating repulsive magnetic fields, attractive magnetic fields can also be generated. Magnetic fields emitted by electromagnets 418-424 can be configured to interact with permanent magnet 402 to cause pivoting portion 412 of cantilevered beam assembly 404 to rotate about a vertical axis of rotation 416 defined by flexures 410. FIG. 4A shows cantilevered beam 406 at a top end of its vertical rotation about axis of rotation 416. Because electromagnets 418-424 are offset from permanent magnet 402, the magnetic fields also generate a lateral force that acts upon cantilevered beam assembly 404 through permanent magnet 402. This lateral force can be controlled so that cantilevered beam 406 is able to oscillate laterally at a natural frequency. In some embodiments, the cantilevered beam is dimensioned to resonate in a bend mode in a plane at a selected frequency. In this way, the vertical and horizontal translation of cantilevered beam 406 generates a raster scan capable of generating a desired output. A rate at which the magnetic fields emitted by electromagnets 418-424 change can be set so that vertical rotation of cantilevered beam 406 is substantially slower than the natural frequency at which cantilevered beam 406 rotates horizontally, allowing multiple horizontal sweeps of cantilevered beam 406 for every vertical traversal of cantilevered beam 406.

Figure 4B:
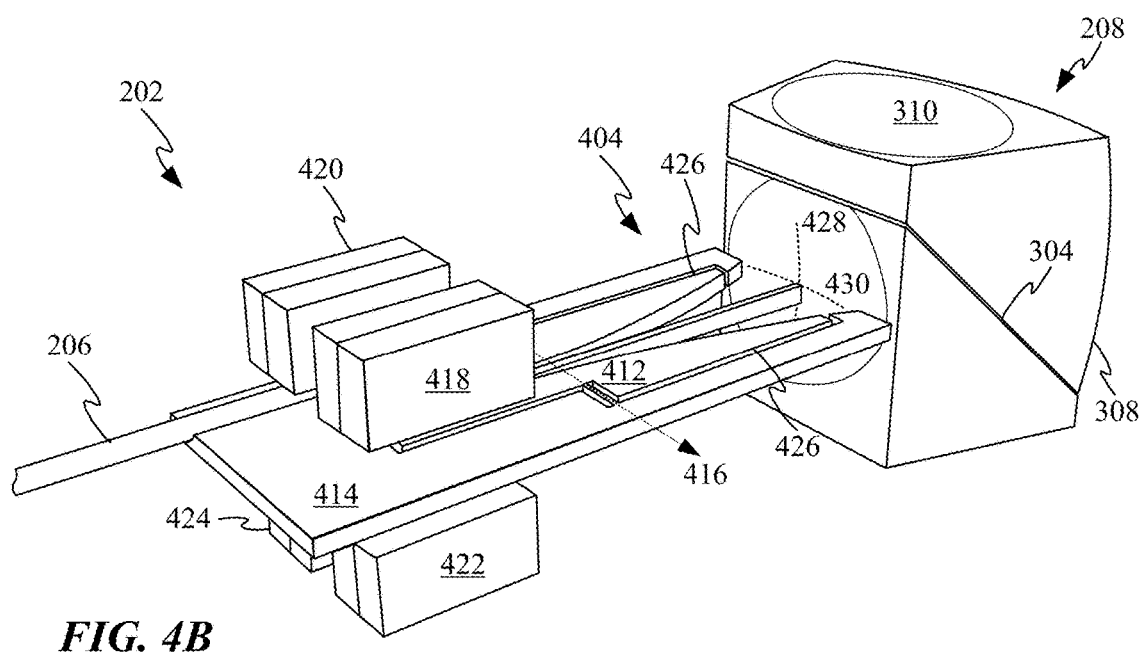

FIG. 4B shows another perspective view of optical scanner 202 and how optical scanner 202 is able to interact with collimating and coupling optic 208 according to an embodiment of the present invention. In particular, pivoting portion 412 of cantilevered beam assembly 404 includes counter balance elements 426 positioned on either side of cantilevered beam 406. Counter balance elements 426 are operative to help balance pivoting portion 412 about axis of rotation 416 thereby limiting the amount of magnetic force needed to rotate pivoting portion 412 about axis of rotation 416. In some embodiment, counter balance elements 426 can also act as mechanical stops that limit lateral movement of cantilevered beam 406. Dashed lines 428 and 430 indicate an amount of vertical and horizontal movement achievable by cantilevered beam during a raster scan.

Figure 4C:
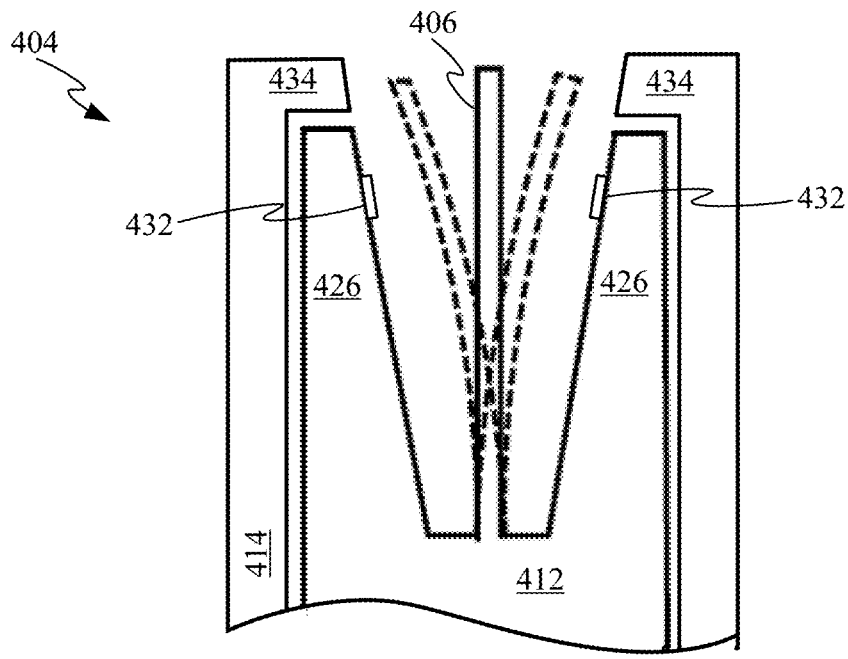

FIG. 4C shows exemplary left and right horizontal deflection of cantilevered beam 406 of cantilevered beam assembly 404 according to an embodiment of the present invention. In some embodiments, counter balance elements 426 can include sensors 432 for tracking movement of cantilevered beam 406. In some embodiments, sensors 432 can take the form of capacitive sensors configured to track conductive metal coatings disposed along an exterior surface of cantilevered beam 406. Sensor data obtained from sensors 432 can be used to synchronize light being emitted from cantilevered beam 406 with a current horizontal position of cantilevered beam 406. Attachment features 434 of stationary portion 414 can wrap around counter balance elements 426 and be coupled to collimating and coupling optic 208 (not shown). In this way, a position of optical scanner 202 can be fixed relative to collimating and coupling optic 208 during operation of optical scanner 202. While other mounting points are not particularly pointed out, it should be appreciated that optical scanner 202 can be secured to an optical frame such as optical frame 111 by mechanical support structure 204 as shown in FIG. 2.

Figure 4D:
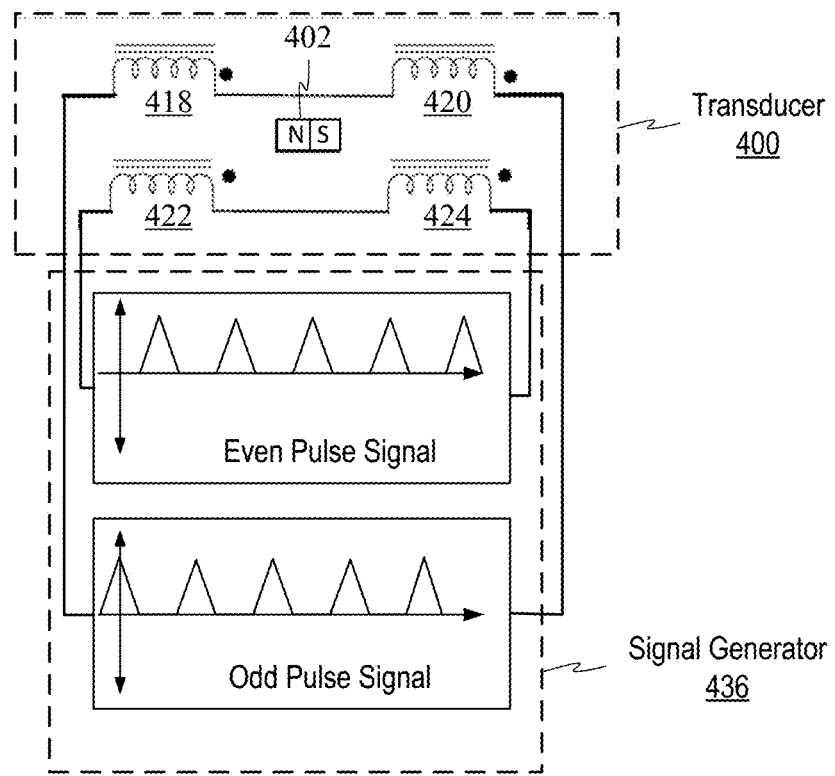
FIG. 4D shows a schematic view of a control system capable of driving the cantilevered beam depicted in FIGS. 4A-4C in a raster scan according to an embodiment of the present invention.

FIG. 4D shows a block diagram illustrating signal generator and components of magnetic transducer system 400 according to an embodiment of the present invention. In particular, signal generator 436 includes both odd and even pulse signal generators that generate triangular waveforms that are offset in phase by $\pi$ radians. Even pulse signals are delivered to electromagnets 418 and 420 of magnetic transducer system 400 while odd pulse signals are delivered to electromagnets 422 and 424. In this way, actuation timing of electromagnets 418-424, which interact with permanent magnet 402, can be offset in order to achieve a desired scan pattern of cantilevered beam 406.

Figure 5A:
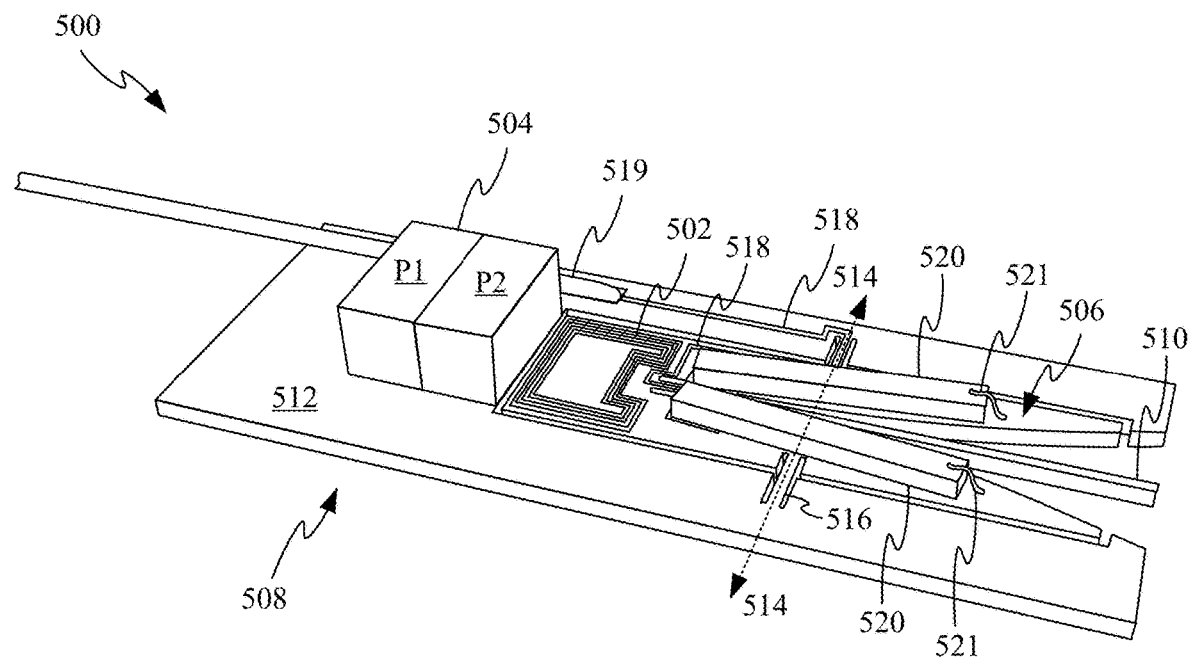
FIGS. 5A-5B show an alternative embodiment in which an optical scanner includes a flat electromagnetic coil that interacts with a permanent magnet mounted adjacent to the electromagnetic coil to generate vertical oscillation of a pivoting portion of the optical scanner according to an embodiment of the present invention.
Figure 5B:
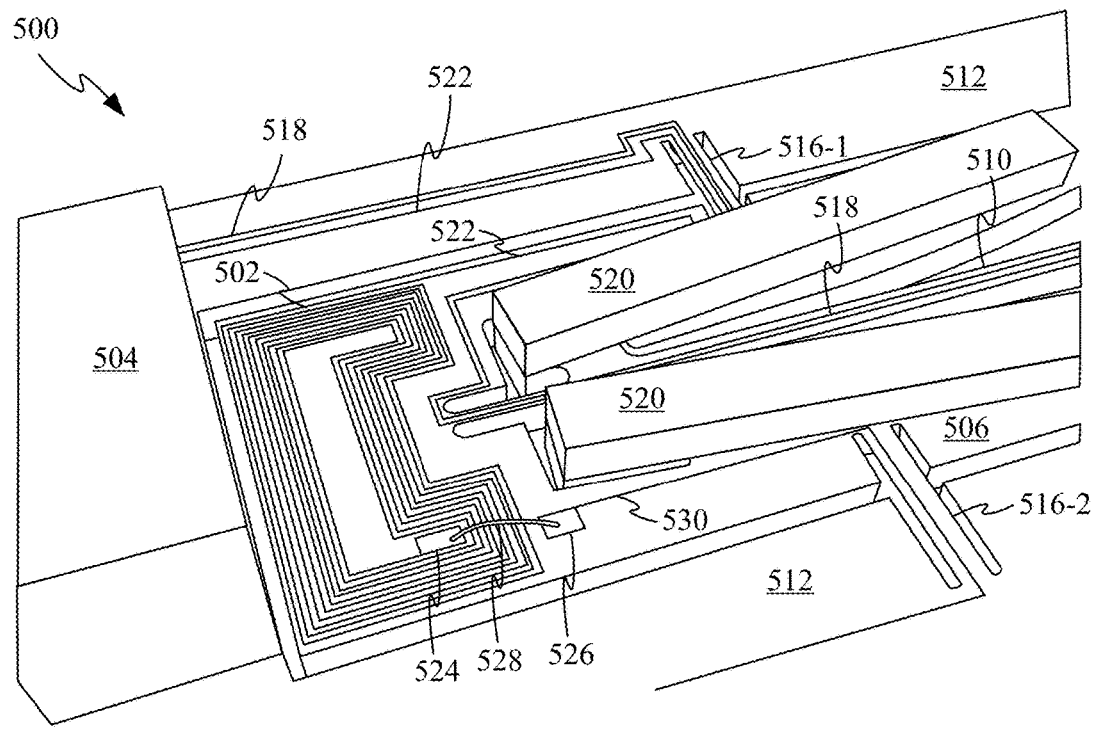

FIGS. 5A-5B show an alternative embodiment in which an optical scanner 500 includes a flat electromagnetic coil 502 that interacts with a permanent magnet 504 mounted adjacent to electromagnetic coil 502 to generate vertical oscillation of a pivoting portion 506 of a cantilevered beam assembly 508 according to an embodiment of the present invention. Routing modulated current through electromagnetic coil 502 generates a shifting magnetic field that interacts with a magnetic field emitted by permanent magnet 504 to induce oscillation of pivoting portion 506, which includes cantilevered beam 510. A rate at which the current is modulated within electromagnetic coil 502 can be set to achieve a desired rate of rotation of pivoting portion 506 of cantilevered beam assembly 508 relative to a stationary portion 512 of cantilevered beam assembly 508 about axis of rotation 514. Pivoting portion 506 and stationary portion 512 can have a thickness of about 100 microns, in some embodiments. A shape of electromagnetic coil 502 can have a rectangular geometry that matches a shape of pivoting portion 506 in order to maximize an area across which electromagnetic coil 502 extends. In some embodiments, spreading electromagnetic coil 502 over a larger area in this manner allows for a stronger and/or more efficient magnetic field to be generated by electromagnetic coil 502. It should be appreciated that a shape of electromagnetic coil 502 can vary widely to match any desired shape of pivoting portion 506. For example, circular, polygonal and elliptical geometries of electromagnetic coil 502 are also possible.

FIG. 5A shows how the rotation of pivoting portion 506 can be defined by flexures 516, which connect pivoting portion 506 to stationary portion 512. Flexures 516 can be sized to accommodate a desired amount of rotation of pivoting portion 506. Flexures 516 can be configured to establish a pathway across which one or more waveguides 518 is able to transmit light received from one or more optical fibers 519 to cantilevered beam 510. In addition to helping transmit light, one or both of flexures 516 can be configured to accommodate an electrically conductive pathway configured to carry electricity for powering electromagnetic coil 502 and piezoelectric actuators 520. In some embodiments, power can be routed to piezoelectric actuators 520 by the electrically conductive pathway(s) that include wires 521 when used to create wire bonds coupling the electrically conductive pathways to terminals on each of piezoelectric actuators 520.

FIG. 5B shows a close up view of a central portion of optical scanner 500. In particular, electromagnetic coil 502 is shown in greater detail. Electrically conductive pathway 522 can extend across stationary portion 512, flexure 516-1 and pivoting portion 506 of cantilevered beam assembly 508 to provide power to and from electromagnetic coil 502 from a power source by virtue of following the depicted spiral pattern. After forming electromagnetic coil 502, electrically conductive pathway 522 can terminate at a conductive pad 524. Conductive pad 524 can be electrically coupled to a conductive pad 526 by coupling opposing ends of wire 528 to pads 524 and 526. This allows for an electrical pathway to extend over the concentric loops of electrically conductive pathway 522 forming electromagnetic coil 502. In some embodiments, electrically conductive pathway 522 can instead be routed through a via extending through pivoting portion 506 in order to bypass the loops of electrically conductive pathway 522 forming electromagnetic coil 502. Electrically conductive pathway 530 can then be routed off pivoting portion 506 and back to the power source to complete a circuit by way of flexure 516-2 and stationary portion 512, as depicted. In some embodiments, flexure 516-1 can carry both electrically conductive pathway 522 and waveguide 518. This configuration allows for an elevation of cantilevered beam 510 to be controlled by magnetic field interaction and for horizontal motion of cantilevered beam 510 to be controlled by alternating actuations of piezoelectric actuators 520.

Figure 5C:
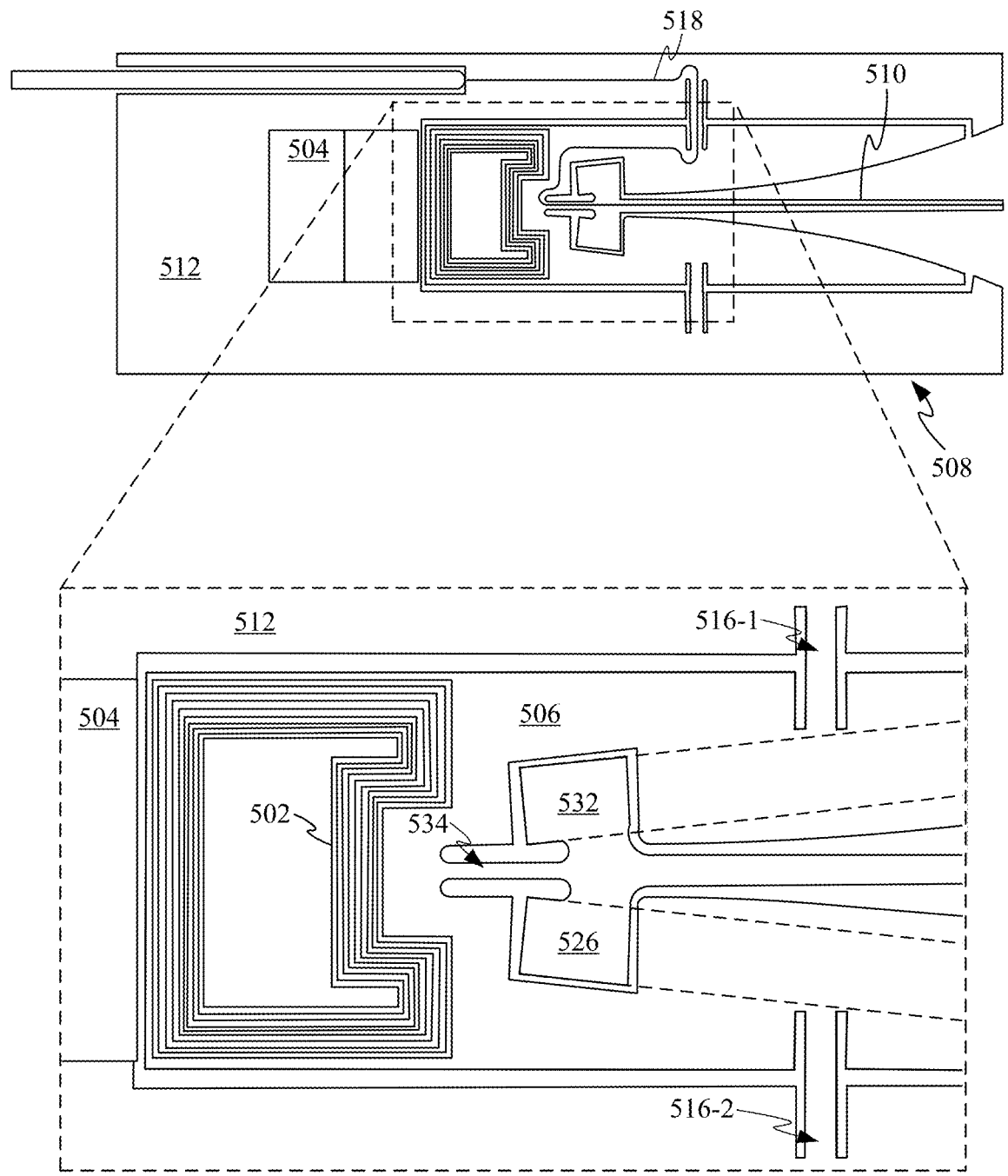
FIG. 5C shows a top view of a cantilevered beam assembly of the optical scanner depicted in FIGS. 5A-5B according to an embodiment of the present invention.

FIG. 5C shows a top view of cantilevered beam assembly 508 according to an embodiment of the present invention. Piezoelectric actuators 520 have been removed and their footprints represented only by dashed lines in order to show a shape and size of attachment bosses 532 that protrude from cantilevered beam 510. Each of attachment bosses 532 can include a pad for mechanical attachment and/or electrical coupling to an end of piezoelectric actuators 520. Attachment bosses 532 are formed by removing material from around cantilevered beam 510 leaving only a horizontal flexure 534 attaching cantilevered beam 510 to the rest of pivoting portion 506. In this way, piezoelectric actuators 520 are able to maneuver cantilevered beam 510 in a desirable scan pattern. In some embodiments, a thickness of horizontal flexure 534 is greater than its width in order to reduce the likelihood of unwanted vertical deflection of cantilevered beam 510, thereby substantially limiting deflection to a plane defined by pivoting portion 506. In this way, vertical motion of cantilevered beam is induced only by forces resulting from interaction between magnetic fields generated by electromagnetic coil 502 and permanent magnet 504.

Figure 5D:
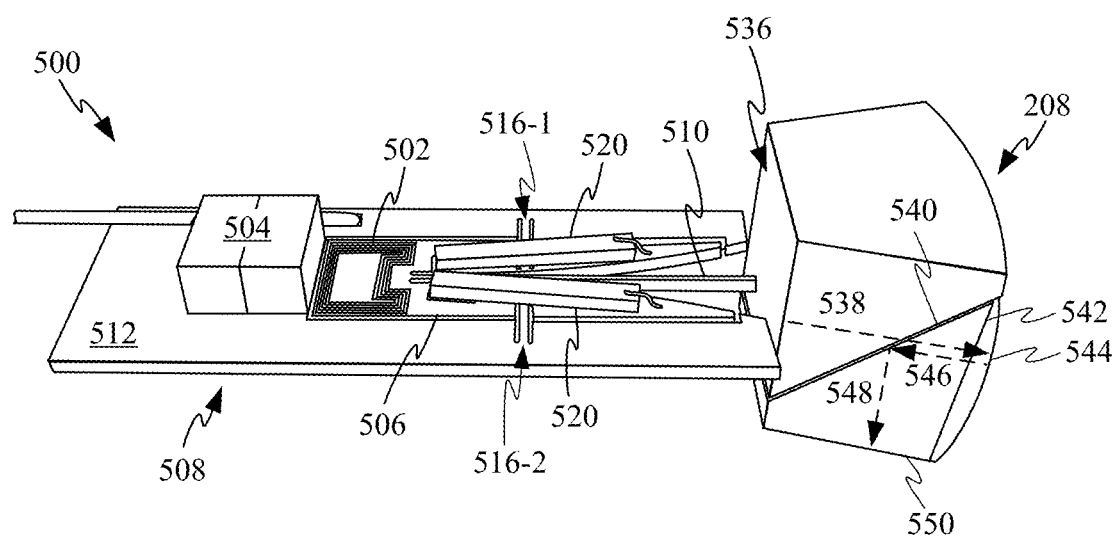
FIG. 5D shows a perspective view of the optical scanner depicted in FIGS. 5A-5C paired with a collimating and coupling optic according to an embodiment of the present invention.

FIG. 5D shows a perspective view of optical scanner 500 paired with collimating and coupling optic 208 according to an embodiment of the present invention. Optical scanner 500 includes flat electromagnetic coil 502 that interacts with permanent magnet 504 mounted adjacent to electromagnetic coil 502 to generate vertical oscillation of pivoting portion 506 of cantilevered beam assembly 508. Routing modulated current through electromagnetic coil 502 generates a shifting magnetic field that interacts with a magnetic field emitted by permanent magnet 504 to induce oscillation of pivoting portion 506, which includes cantilevered beam 510. A rate at which the current is modulated within electromagnetic coil 502 can be set to achieve a desired rate of rotation of pivoting portion 506 of cantilevered beam assembly 508 relative to a stationary portion 512 of cantilevered beam assembly 508 about axis of rotation 514. Pivoting portion 506 and stationary portion 512 can have a thickness of about 100 microns, in some embodiments. A shape of electromagnetic coil 502 can have a rectangular geometry that matches a shape of pivoting portion 506 in order to maximize an area across which electromagnetic coil 502 extends. In some embodiments, spreading electromagnetic coil 502 over a larger area in this manner allows for a stronger and/or more efficient magnetic field to be generated by electromagnetic coil 502. It should be appreciated that a shape of electromagnetic coil 502 can vary widely to match any desired shape of pivoting portion 506. For example, circular, polygonal and elliptical geometries of electromagnetic coil 502 are also possible. Piezoelectric actuators 520 are configured to oscillate cantilevered beam 510 horizontally. Consequently, the horizontal motion generated by piezoelectric actuators 520 in combination with vertical motion induced by electromagnet 502 and permanent magnet 504 are operative to generate raster scan that moves across in-coupling surface 536 of collimating and coupling optic 208.

FIG. 5D shows how light 538 received from cantilevered beam 510 of optical scanner 500 by collimating and coupling optic 208 passes through a polarization selective reflector 540, which is configured to allow light only polarized in one direction to pass therethrough. Light 538 then passes through a quarter wave plate (QWP) 542 before being incident on a mirrored surface 544. The QWP 542 transforms the linearly polarized light that has passed through the polarization selective reflector 540 to circularly polarized light. Reflection by the mirrored surface 544 switches the handedness of the circularly polarized light, and upon passing once again through the QWP 542, the circularly polarized light 546 is converted to linearly polarized light having a polarization orientation that is opposite to the initial polarization orientation of light 538 and, therefore, polarized light 546 is reflected by polarization selective reflector 540 (as opposed to passing through polarization selective reflector 540). Polarization selective reflector 540 reflects light 548 toward an exit surface 550. In some embodiments, exit surface 550 can include optics for enlarging and/or full collimating light exiting collimating and coupling optic 208. It should be noted that dashed arrows associated with light 538, 546 and 548 are merely shown for illustrative purposes only and that a ray-traced representation of the light would have a more varied appearance but would still proceed through and be reflected off polarization selective reflector 540 in the same manner.

Figure 6A:
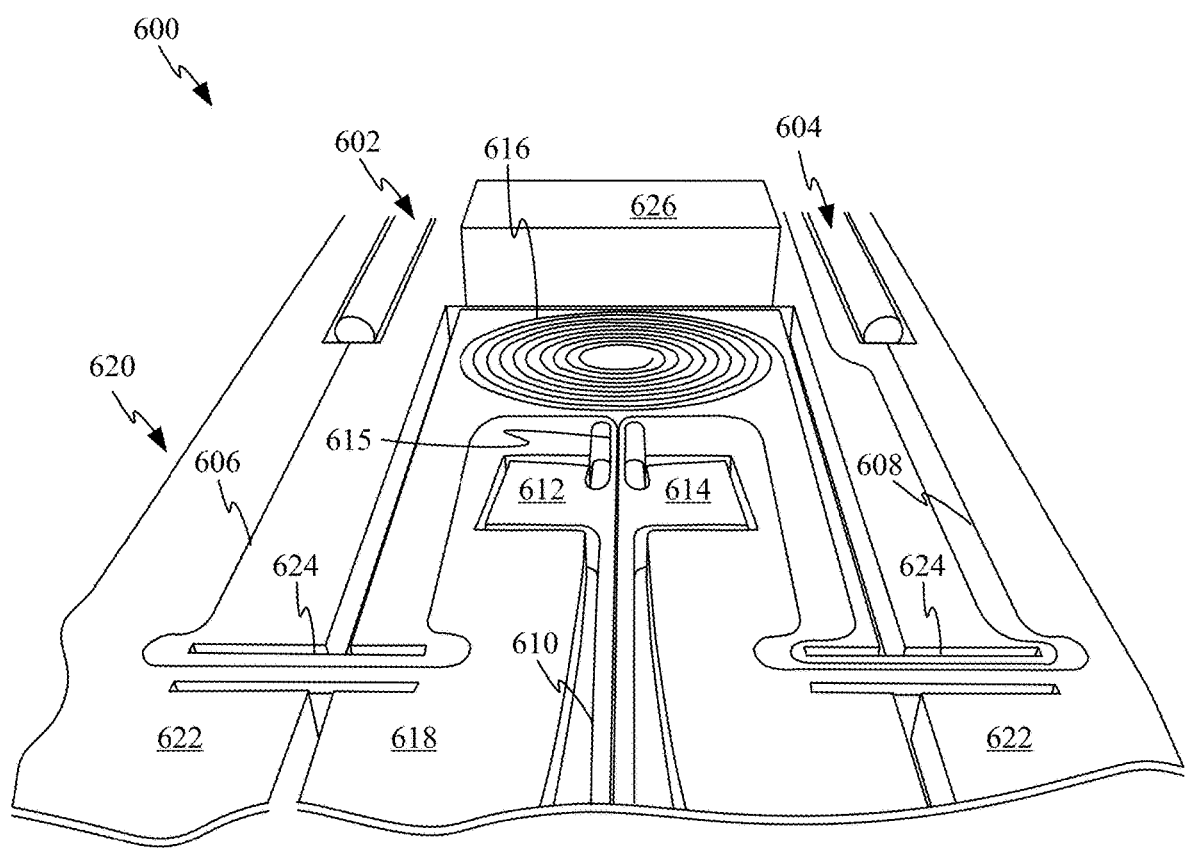
FIG. 6A shows a partial front perspective view of an optical scanner configured to receive light from multiple light sources according to an embodiment of the present invention.

FIG. 6A shows a partial front perspective view of an optical scanner 600 configured to receive light from multiple light sources according to an embodiment of the present invention. As depicted, light delivered by the light sources can be delivered by optical fibers 602 and 604 that deliver light to respective waveguides 606 and 608 configured to route the light delivered by optical fibers 602 and 604 to a distal end of a cantilevered beam 610. Cantilevered beam 610 includes attachment bosses 612 and 614, which can provide areas upon cantilevered beam 610 to which piezoelectric actuators can be attached. For example, attachment pads can be positioned upon attachment bosses 612 and 614 for attachment to one end of a piezoelectric actuator. By applying actuating inputs to attachment bosses 612 and 614 with piezoelectric actuators as shown in previous embodiments, cantilevered beam 610 can be induced to oscillate back and forth. Cantilevered beam is connected to the rest of optical scanner 600 by horizontal flexure 615, which can take the form of a narrow strip of material that provides a connection across which waveguides 606 and 608 can run.

FIG. 6A shows how electromagnetic coil 616 can be affixed to a pivoting portion 618 of cantilevered beam assembly 620 to induce rotation of pivoting portion 618 relative to a pivoting portion 622 of cantilevered beam assembly 620 about an axis extending through pitch flexures 624. In some embodiments, electromagnetic coil 616 can be electrically coupled to through vias extending through pivoting portion 618. In this way, the vias can connect electromagnetic coil 616 to electrically conductive traces disposed upon a downward facing surface of pivoting portion 618. In this way, electrical traces can be formed on the downward facing surface and waveguides 606 and 608 upon an upward facing surface of pivoting portion 618. As described with regards to the previous embodiments, activation of electromagnetic coil 616 can generate a magnetic field that interacts with a magnetic field emitted by permanent magnet 626 to effect vertical oscillation of pivoting portion 618 about the axis defined by pitch flexures 624 relative to stationary portion 622. An overall thickness of pivoting portion 618 and stationary portion 622 can be about 100 microns. In some embodiments, this thickness can vary between 50 and 150 microns based on a desired vibrational frequency and/or part durability.

Figure 6B:
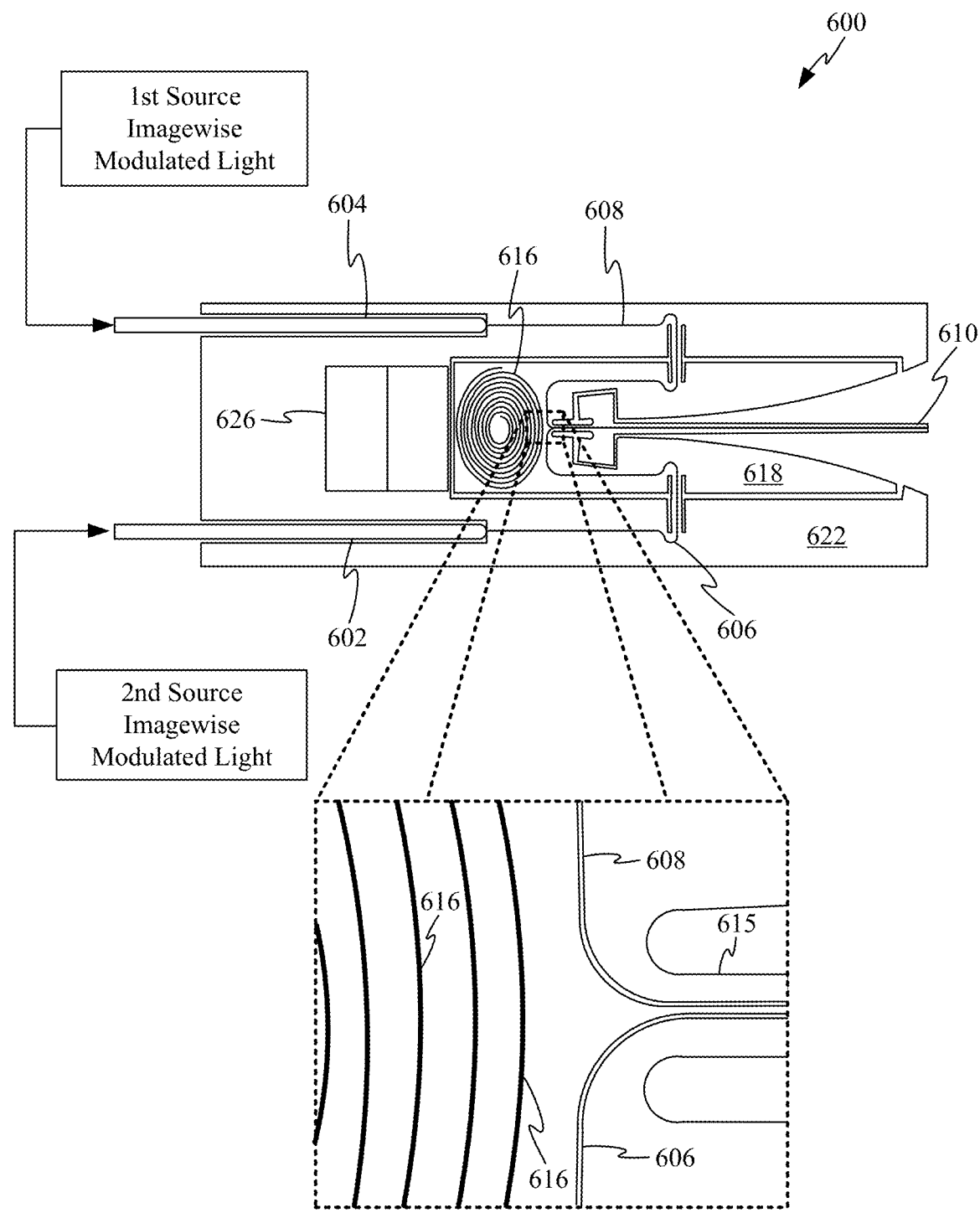
FIG. 6B shows a top view of an optical scanner receiving light from two discrete optical fibers carrying imagewise modulated light according to an embodiment of the present invention.

FIG. 6B shows a top view of optical scanner 600 receiving light from two discrete optical fibers carrying imagewise modulated light from two separate sources of imagewise modulated light according to an embodiment of the present invention. Both the first and second sources of imagewise modulated light can include drive units that vary the output of light based upon a determined position of cantilevered beam 610. Light producing elements configured to generate the light can take many forms, including an array of LEDs or lasers, allowing multiple different colors to be routed through each of optical fibers 602 and 604. A close up view shows how waveguides 606 and 608, which route light received from optical fibers 602 and 604 to pivoting portion 618, continue routing the light to cantilevered beam 610 and then run parallel to one another along a top surface of horizontal beam flexure 615 of cantilevered beam 610 and extend down cantilevered beam 610 until reaching a distal end of cantilevered beam 610.

Figure 6C:
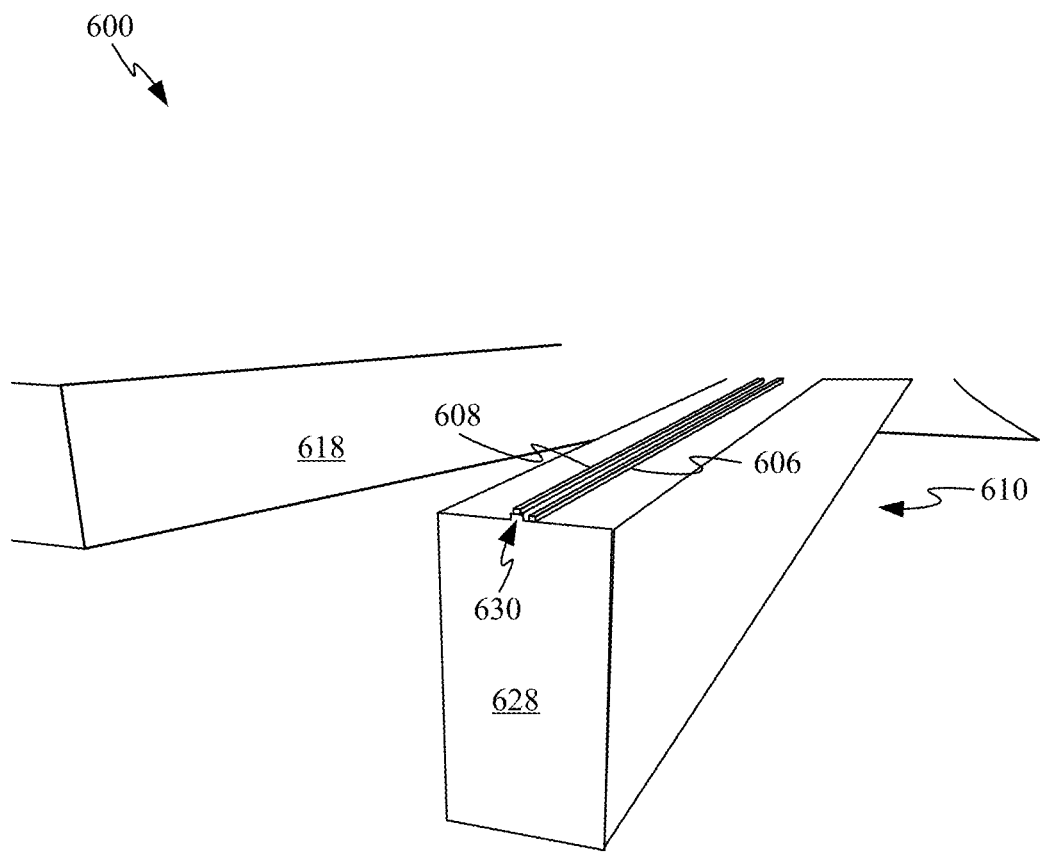
FIG. 6C shows a perspective view of waveguides disposed on a distal end of a cantilevered beam according to an embodiment of the present invention.

FIG. 6C shows how waveguides 606 and 608 reach a distal end 628 of cantilevered beam 610 according to an embodiment of the present invention. Waveguide 608 can be elevated above waveguide 606 by step structure 630 of cantilevered beam 610. Spatially offsetting waveguides 606 and 608 from one another, allows two discrete rows of pixels to be concurrently generated allowing for an increase in refresh rate and/or spatial resolution achievable by optical scanner 600. It should be noted that while only two waveguides are shown, a total of three or more waveguides is also possible. For example, with three waveguides, one primary color of light could be associated with each waveguide.

It should be appreciated that while FIGS. 5A-6C depict the electromagnet being consistently positioned upon the pivoting portion of the cantilevered beam assembly, that in some embodiments, the position of the electromagnetic coil and permanent magnet could be swapped. In this way, electrical pathways routed along the horizontal flexures would only be responsible for delivering power to the piezoelectric actuators.

Figure 7:
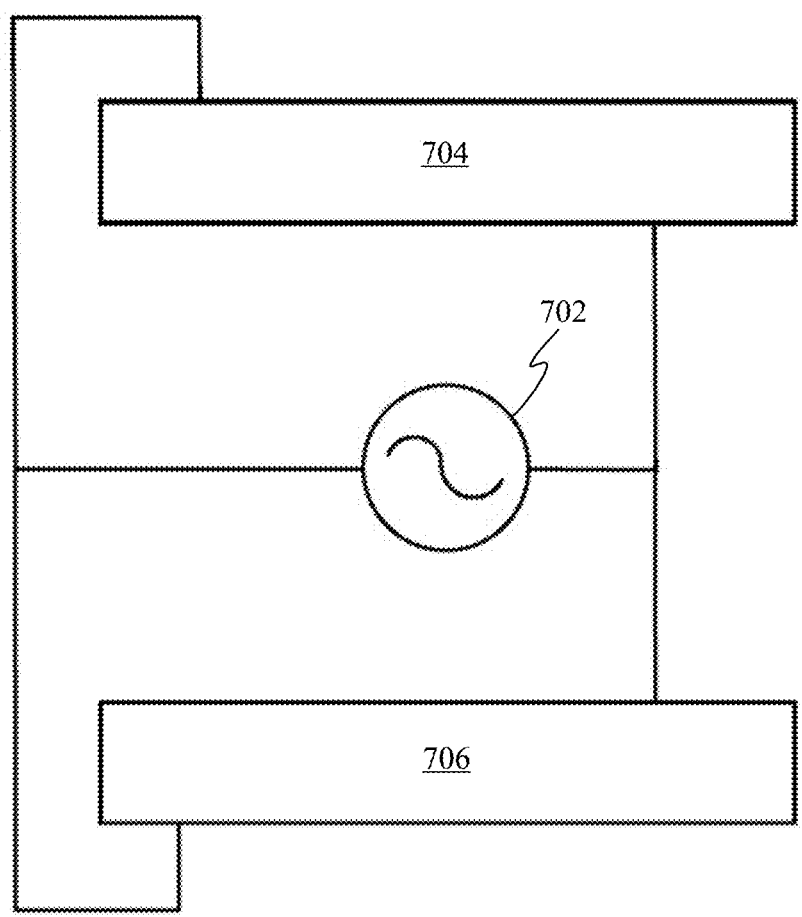
FIG. 7 depicts a signal generator suitable for driving piezoelectric actuators suitable for use with the optical scanners depicted in FIGS. 5A-6B according to an embodiment of the present invention.

FIG. 7 depicts a signal generator suitable for driving piezoelectric actuators suitable for use with optical scanners 500 and 600 (e.g., piezoelectric actuators 520 as shown in FIGS. 5A-5B) according to an embodiment of the present invention. Signal generator 702 can be configured to output a sinusoidal wave that drives piezoelectric actuators 704 and 706 180 degrees out of sync in order to maximize an amount of twist achieved by a given amount of extension of actuators 704 and 706. A frequency and amplitude of signal generator 702 can be setup to match a natural frequency of a cantilevered beam of a corresponding optical scanner. In this way, horizontal movement of the cantilevered beam can maintain a predictable speed allowing for predictable control of the cantilevered beam.

Figure 8:
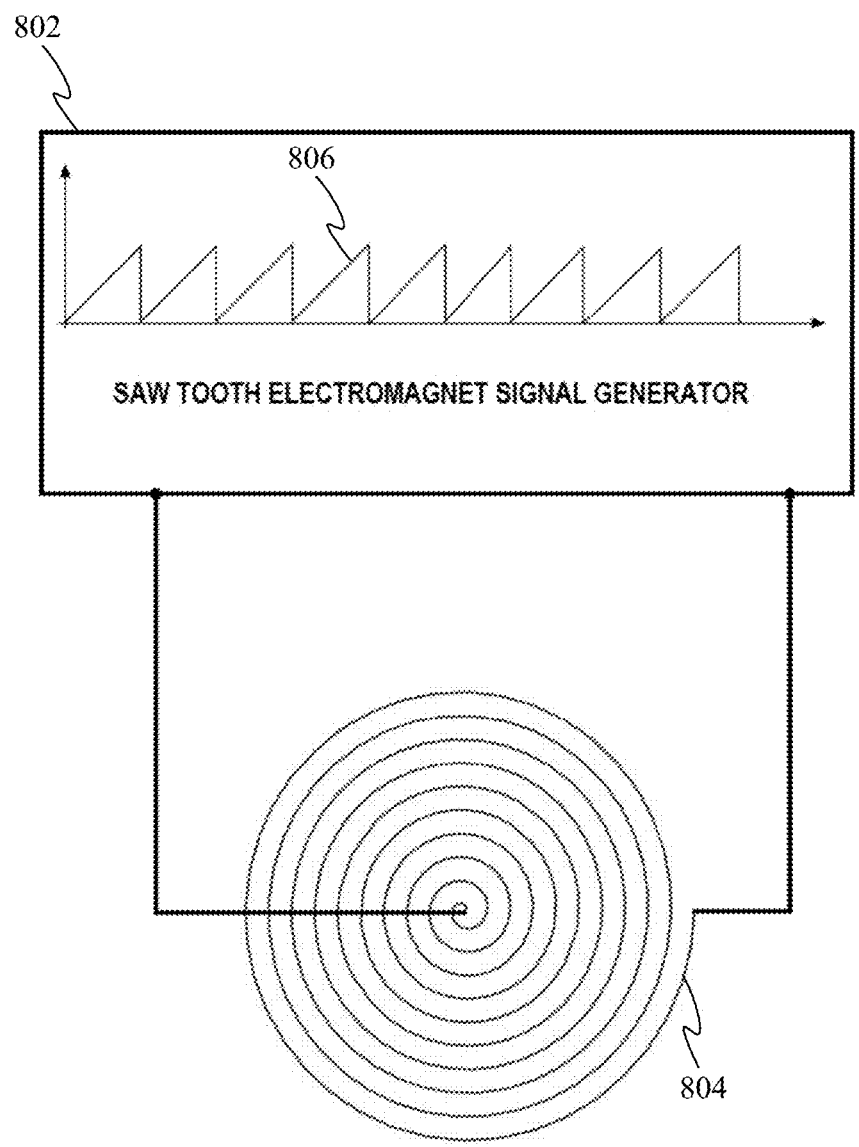
FIG. 8 depicts a signal generator for driving an electromagnet suitable for use with the optical scanners depicted in FIGS. 5A-6B according to an embodiment of the present invention.

FIG. 8 depicts a signal generator 802 for driving an electromagnet 804 suitable for use with the optical scanners depicted in FIGS. 5A-6B according to an embodiment of the present invention. Signal generator 802 can be configured to generate a saw-tooth signal 806 that causes electromagnet 804 to generate a shifting magnetic field configured to interact with a permanent or electromagnet of an optical scanner to control a pitch of a cantilevered beam of the optical scanner. A ramp portion of the saw tooth signal provides a gradually increasing magnetic field to be emitted that moves a pivoting portion of the optical scanner at a consistent rate in a first direction. When the signal drops back to zero, the pivoting portion can quickly move in the second direction back to a starting position of the pivoting portion. It should be appreciated that a frequency of saw-toothed signal 806 can be substantially lower than a frequency of the sinusoidal waves generated by signal generator 702 when signal generators 702 and 802 are used in a single optical scanner such as optical scanner 500 or 600. By using a lower frequency input to generate vertical motion of the pivoting portion, vertical oscillation can be slower lower than the horizontal oscillation of the cantilevered beam allowing for an increased number of horizontal sweeps of the cantilevered beam for each vertical scan of the cantilevered beam. It should be noted that a similar signal generator could be used to drive one or more of electromagnets 418-424 as depicted in FIGS. 4A-4D. In some embodiments, input signals associated with signal generators driving each of electromagnets 418-424 could only vary in phase.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An optical scanner comprising:
    a cantilevered beam assembly, comprising:
        a stationary portion;
        a pivoting portion comprising a cantilevered beam dimensioned to resonate in a bend mode in a plane at a first frequency;
        at least one torsional flexure coupling the pivoting portion to the stationary portion, the at least one torsional flexure being configured to allow the pivoting portion to rotate about an axis defined by the at least one torsional flexure; and
    a transducer for maneuvering the cantilevered beam in a scan pattern.

2. The optical scanner as recited in claim 1, further comprising:
    an optical waveguide terminating at a distal end of the cantilevered beam.

3. The optical scanner as recited in claim 2, wherein the optical waveguide also extends over the at least one torsional flexure.

4. The optical scanner as recited in claim 1, wherein the at least one torsional flexure includes a first torsional flexure and a second torsional flexure disposed on opposing sides of the pivoting portion.

5. The optical scanner as recited in claim 1, wherein the transducer comprises an electromagnet.

6. The optical scanner as recited in claim 5, wherein a distal end of the cantilevered beam is positioned at a first end of the pivoting portion and a first portion of the transducer is attached to a second end of the pivoting portion opposite the first end.

7. The optical scanner as recited in claim 6, wherein a second portion of the transducer is attached to the stationary portion of the cantilevered beam assembly.

8. The optical scanner as recited in claim 6, wherein the first portion of the transducer comprises the electromagnet.

9. The optical scanner as recited in claim 8, further comprising a second portion of the transducer including a second magnet attached to the stationary portion of the cantilevered beam assembly.

10. An optical scanner, comprising:
    a cantilevered beam assembly, comprising:
        a pivoting portion comprising a cantilevered beam;
        a stationary portion;
        a first torsional flexure coupling a first side of the pivoting portion to the stationary portion; and
        a second torsional flexure coupling a second side of the pivoting portion to the stationary portion; and
        a transducer comprising a first magnetic element disposed on the pivoting portion and a second magnetic element disposed on the stationary portion, the first and second magnetic elements being configured to generate magnetic fields that interact to rotate the pivoting portion relative to the stationary portion about an axis defined by the first and second torsional flexures.

11. The optical scanner as recited in claim 10, wherein the first magnetic element of the transducer comprises an electromagnet.

12. The optical scanner as recited in claim 11, wherein the electromagnet comprises a permanent magnet.

13. The optical scanner as recited in claim 10, wherein the cantilevered beam comprises a waveguide extending across both the pivoting portion and the stationary portion of the optical scanner.

14. The optical scanner as recited in claim 13, further comprising an optical fiber coupled to a first end of the waveguide.

15. The optical scanner as recited in claim 10, further comprising a piezoelectric actuator coupled to the cantilevered beam and configured to induce horizontal oscillation of the cantilevered beam.

16. The optical scanner as recited in claim 10, further comprising:
- a first optical fiber and a first waveguide configured to deliver light from the first optical fiber to a distal end of the cantilevered beam; and
- a second optical fiber and a second waveguide configured to deliver light from the second optical fiber to the distal end of the cantilevered beam.

17. The optical scanner as recited in claim 16, wherein the first waveguide extends across the first torsional flexure and the second waveguide extends across the second torsional flexure.

18. An optical scanner, comprising:
- a cantilevered beam assembly, comprising:
  - a stationary portion;
  - a pivoting portion comprising a cantilevered beam dimensioned to resonate in a bend mode in a plane at a first frequency;
  - at least one torsional flexure coupling the pivoting portion to the stationary portion, the at least one torsional flexure being configured to allow the cantilevered beam to rotate about an axis defined by the at least one torsional flexure;
- a transducer for maneuvering the cantilevered beam in a scan pattern;
- a first optical fiber and a first waveguide configured to deliver light from the first optical fiber to a distal end of the cantilevered beam; and
- a second optical fiber and a second waveguide configured to deliver light from the second optical fiber to the distal end of the cantilevered beam.

19. The optical scanner as recited in claim 18, wherein the transducer comprises a permanent magnet and an electromagnet.

20. The optical scanner as recited in claim 19, wherein the pivoting portion further comprises first and second piezoelectric actuators configured to induce horizontal motion of the cantilevered beam.

* * * * *